US008733490B2

(12) United States Patent
Beavis et al.

(10) Patent No.: US 8,733,490 B2
(45) Date of Patent: May 27, 2014

(54) IDLER WHEEL ASSEMBLY FOR SNOWMOBILE

(75) Inventors: Andrew Beavis, Goodridge, MN (US); Jonathon Edwards, Viking, MN (US); Ken Fredrickson, Theif River Falls, MN (US); Ronald Bergman, Mentor, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 13/307,758

(22) Filed: Nov. 30, 2011

(65) Prior Publication Data

US 2013/0133967 A1  May 30, 2013

(51) Int. Cl.
*B62M 29/00* (2006.01)
*B60B 9/00* (2006.01)

(52) U.S. Cl.
USPC .............................. 180/190; 305/136; 305/199

(58) Field of Classification Search
CPC ....................................................... B62D 55/14
USPC ................................... 180/190; 305/136, 199
See application file for complete search history.

(56) References Cited

U.S. PATENT DOCUMENTS

| 3,758,169 | A |   | 9/1973  | Trapp |            |
|-----------|---|---|---------|-------|------------|
| 3,915,511 | A | * | 10/1975 | Clasper et al. | 474/187 |
| 3,979,154 | A | * | 9/1976  | Groff | 474/197    |
| 5,340,206 | A | * | 8/1994  | Young | 305/136    |
| 5,607,210 | A | * | 3/1997  | Brazier | 305/131  |
| 7,252,348 | B2 | * | 8/2007  | Gingras | 305/136  |
| 7,594,557 | B2 | * | 9/2009  | Polakowski et al. | 180/190 |
| 7,694,768 | B2 | * | 4/2010  | Giese et al. | 180/190 |
| 7,802,645 | B2 | * | 9/2010  | Mallette et al. | 180/190 |

* cited by examiner

*Primary Examiner* — Joseph M Rocca
*Assistant Examiner* — Marlon Arce
(74) *Attorney, Agent, or Firm* — Lowe Graham Jones PLLC

(57) ABSTRACT

An idler wheel assembly, for example a rear idler wheel assembly, for a snowmobile and includes at least one cross-member that permits load transfer and possible load damping as between a pair of rear idler wheels. The cross-member may be configured to transfer lateral loads, bending loads and other types of loads between the idler wheels. The cross-member is arranged between the wheels in such a manner that it is free to rotate with the idler wheels without interference to or from other structure of a skid frame assembly of the snowmobile. In one embodiment, each idler wheel includes a cross-member that extends inward to connect to the other wheel.

21 Claims, 6 Drawing Sheets

IDLER WHEEL ASSEMBLY FOR SNOWMOBILE

FIELD OF THE INVENTION

This invention relates generally to an idler wheel assembly for a snowmobile and, more specifically, to a lighter and more robust rear idler wheel assembly for a snowmobile skid frame assembly.

BACKGROUND OF THE INVENTION

Conventional snowmobiles typically have a skid frame assembly for supporting an endless flexible drive track. The skid frame assembly generally includes low-friction wear-strips respectively coupled to slide rails, a number of cross-brace axles extending from one slide rail to the other, a suspension system, one or more idler wheel assemblies, and other structural support. By way of example, a rear idler wheel assembly is coupled to an aft portion of the skid frame assembly and provides a surface on which the continuous track makes approximately a 160 degree turn. Because the rear idler wheel assembly is located sufficiently aft of the snowmobile's center of gravity it is desirable to reduce the weight of the rear idler wheels in order to more effectively centralize the overall mass for better handling. Therefore, the rear idler wheels are typically made of a lightweight, structural material and have spokes or lightening holes for weight reduction purposes.

A snowmobile rides on various non-uniform surfaces and all types of on- and off-trail conditions, as such it must be able to contend with many different riding environments. The terrain may change from smooth trails to large bumps and jumps to deep snow with occasional hidden rocks or stumps. Snow conditions can vary from grippy hard-pack to bottomless powder, from smooth trails to rough and bumpy ones. In turn, the idler wheel assemblies, and specifically the rear idler wheel assembly, should be optimized to strike a balance between weight and load capacity or structural robustness.

SUMMARY OF THE INVENTION

The present invention relates to an idler wheel assembly for a skid frame assembly of a snowmobile and in one embodiment to a rear idler wheel assembly that is lightweight and more structurally robust as compared to conventional idler wheel assemblies. By way of example, the rear idler wheel assembly includes at least one cross-member that permits load transfer and possible load damping as between a pair of rear idler wheels. The cross-member may be configured to transfer lateral loads or the lateral component of a load, bending loads, and other types of loads between the idler wheels. Lateral loads are generally side loads directed approximately parallel to a rotational axis of the wheel. The cross-member is connected between the wheels in such a manner that it is free to rotate with the idler wheels without interference to or from other structure of the skid frame assembly.

In accordance with an aspect of the invention, a snowmobile includes a powertrain system, a pair of front skis, a steering assembly, a skid frame, and an idler wheel assembly. The powertrain system includes an engine, a drivetrain, and an endless flexible track propelled by the drivetrain. The steering assembly is maneuverable to turn the front skis. The skid frame assembly has at least one pair of slide rails. The idler wheel assembly is coupled to the skid frame assembly. The idler wheel assembly includes at least two idler wheels aligned on a common rotational axis. The idler wheels are interconnected to transfer loads between the idler wheels.

In accordance with another aspect of the invention, a skid frame assembly configured to receive a track of a snowmobile includes a pair of slide rails and a pair of idler wheels coupled to the slide rails. Each idler wheel includes an outer diameter surface and a hub. A cross-member extends from one idler wheel and interconnects with the other idler wheel. The cross-member is substantially aligned with a common rotational axis of the idler wheels. The cross-member is located between the outer diameter surface and the hub.

In accordance with yet another aspect of the invention, a method for arranging idler wheels of a snowmobile includes the steps of (1) coupling a first idler wheel to an inner surface of a skid frame assembly; (2) coupling a second idler wheel to another inner surface of the skid frame assembly, the idler wheels sharing a common rotational axis; and (3) structurally coupling the first and second idler wheels together with a cross-member that extends substantially parallel to the common rotational axis.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

As will be described in further detail below, at least one embodiment of the invention includes a snowmobile having a lighter weight and more structurally robust idler wheel assembly in which the wheels are coupled together by one or more cross-members. As discussed above, snow conditions (i.e., loading conditions) can vary from hard-packed to bottomless powder, from smooth trails to rough and bumpy ones. While idler wheel assemblies, and rear idler wheel assemblies in particular, may be designed with a balance between weight and load capacity or structural robustness, it is axiomatic that overload conditions may occur and still cause damage to one or more of the idler wheels. For example if a rear idler wheel takes a sharp blow in a direction not aligned with the plane of its face, the lateral load may misalign the wheel at the same time the track is pulling on the wheel to increase the load on the misaligned wheel. Such action may fold the wheel to the point that it fails through excessive plastic yielding or by having a bearing become misaligned or released from its center. Using the rear idler wheel assembly as an example, an aggressive driver may be more apt to cause damage to one of the rear idler wheels when taking corners sharply or maneuvering over rough terrain. Unfortunately if damage does occur to one of the rear idler wheels it will likely cause the snowmobile to be essentially immovable or non-drivable. While idler wheels are not difficult to remove and replace, they are also not one of the components that many riders carry as a spare part. Thus in some instances, snowmobiles have been stranded overnight or longer until the rider or another can obtain a spare idler wheel or wheels. Accordingly, at least one embodiment of the present invention provides an idler wheel assembly that is lightweight and more structurally robust than a conventional idler wheel assembly.

Figure 1:
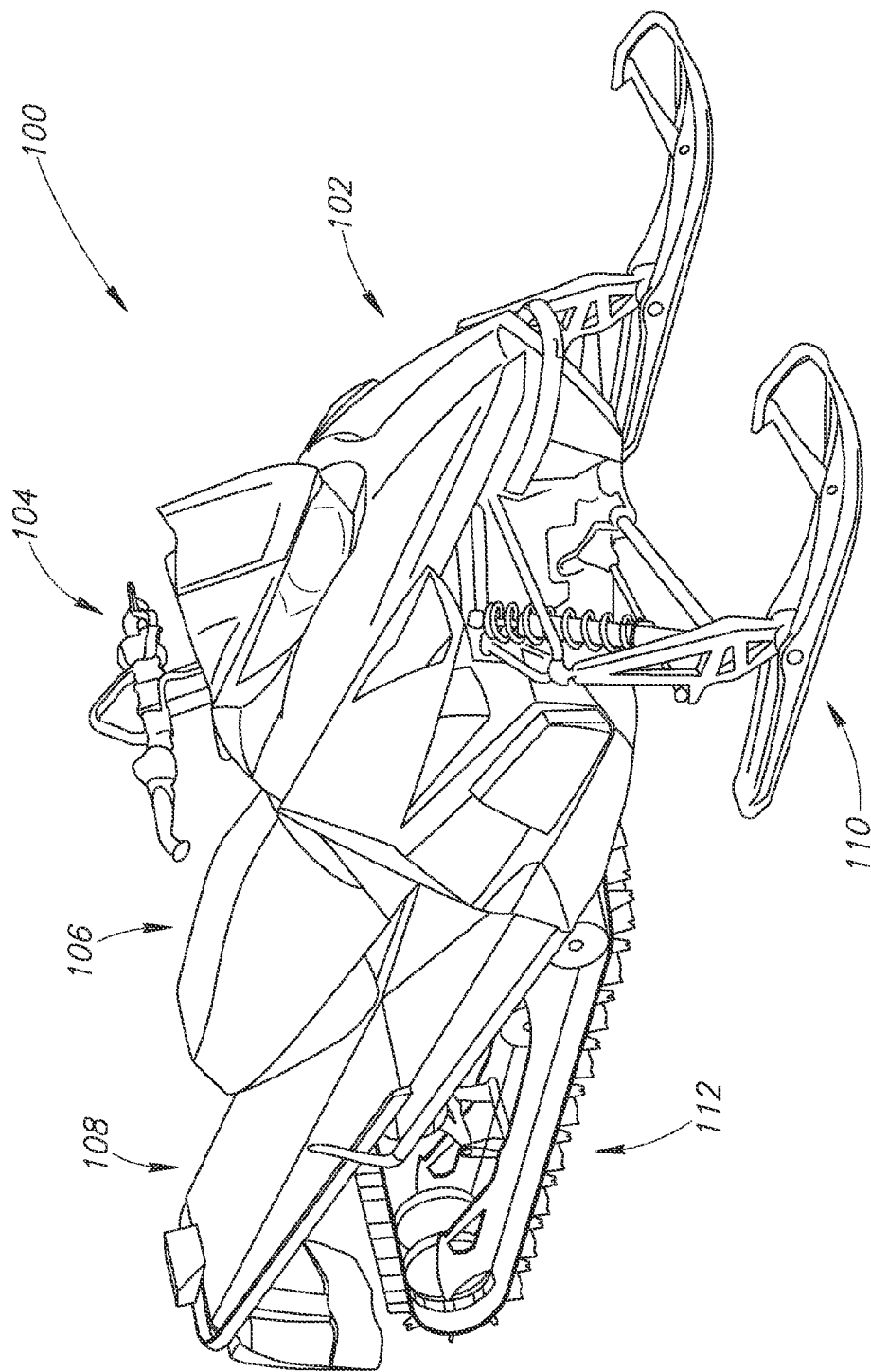
FIG. 1 is a perspective view of a snowmobile having a skid frame assembly with an idler wheel assembly according to an embodiment of the present invention.
Figure 2:
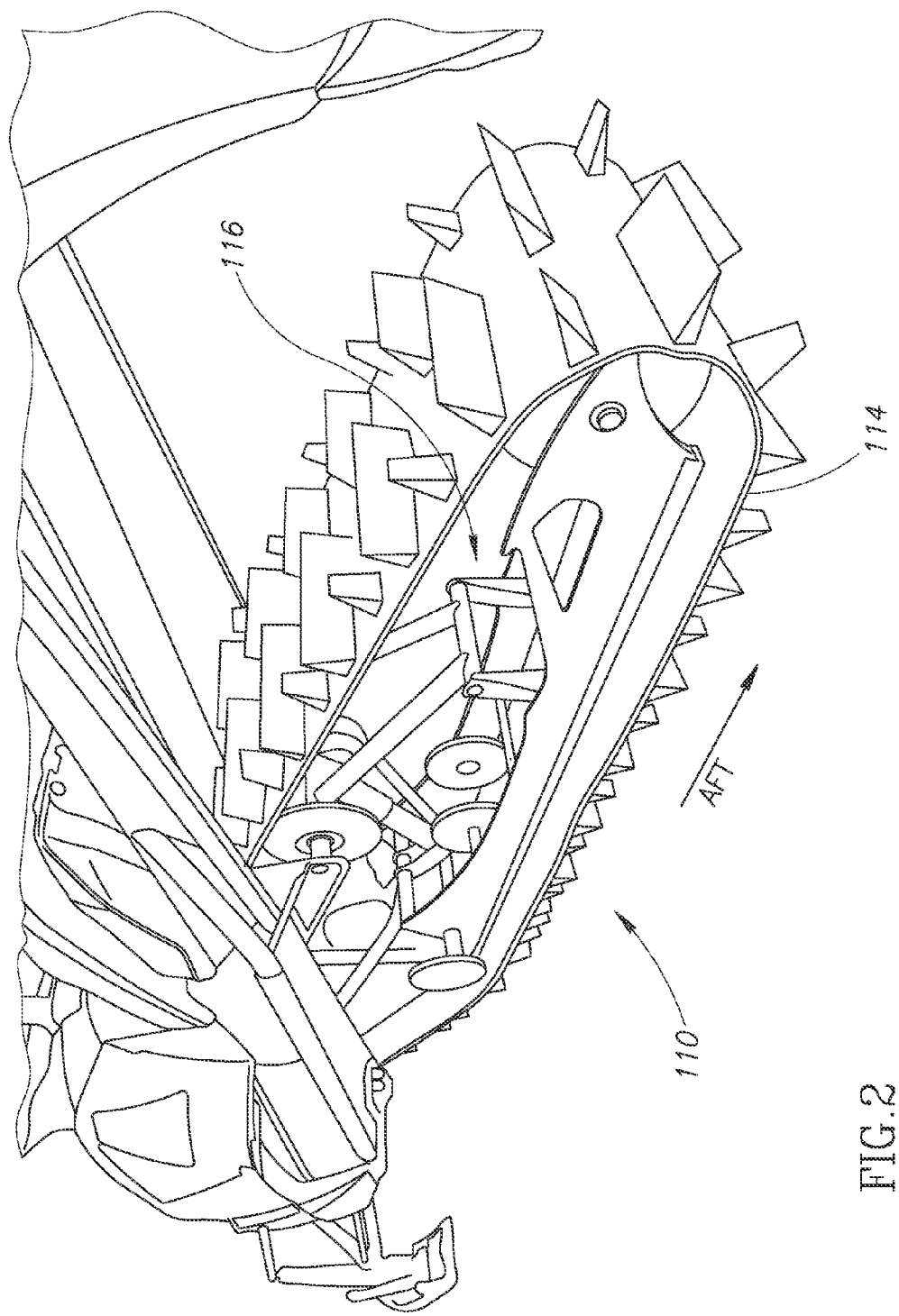
FIG. 2 is another perspective view looking into the skid frame assembly for a closer view of the rear wheel assembly of FIG. 1.

FIG. 1 shows a snowmobile 100 having a front body panel 102, handlebars 104, a seat 106, a tunnel 108, a front ski and suspension assembly 110, and a skid frame/track assembly 112. Referring now to FIG. 2, the skid frame/track assembly 112 includes an endless flexible drive track 114 and a skid frame assembly 116 about which the track 114 moves. The endless flexible drive track 114 may take the form of one of the drive tracks described in U.S. Pat. Nos. 7,422,295 and 7,712,846, which are incorporated by reference herein in their entireties.

Figure 3:
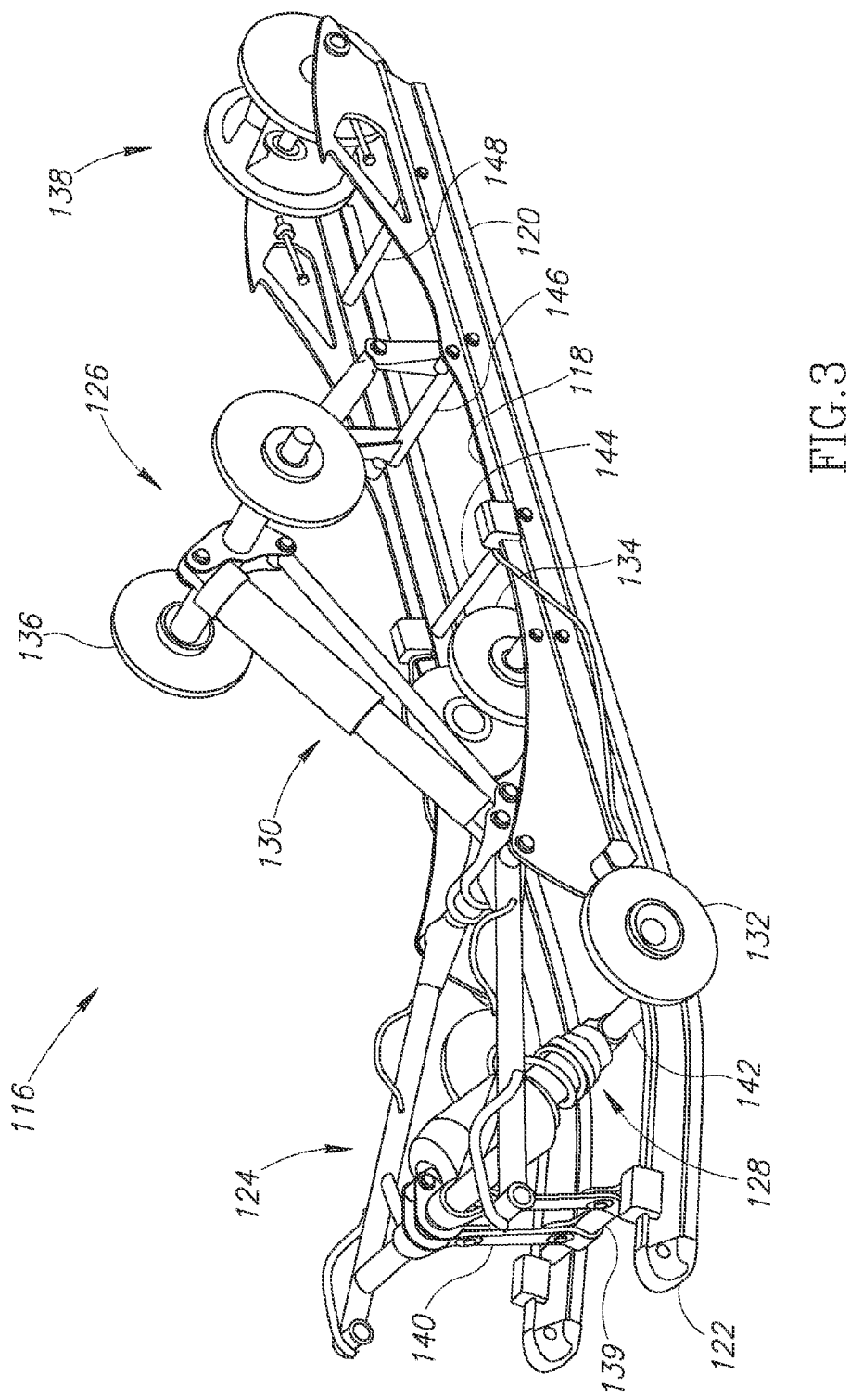
FIG. 3 is a perspective view of the skid frame assembly without the endless drive track, but showing the idler assembly with cross-members according to an embodiment of the present invention.

FIG. 3 shows the skid frame assembly 116 having a skid framework 118 with wearstrips 120 attached thereto. End caps 122 are attached to the end portions of the skid framework 118. The skid frame assembly 116 includes a front suspension assembly 124, a rear suspension assembly 126, a front shock 128, and a rear shock 130. In addition, the skid frame assembly 116 may include a plurality of idler wheel assemblies. In the illustrated embodiment, the skid frame assembly 116 includes a front idler wheel assembly 132, an intermediate-lower idler wheel assembly 134, an intermediate-upper idler wheel assembly 136, and a rear idler wheel assembly 138. The idler wheel assemblies may be located on an outside of the skid frame assembly 116 such as the front idler wheel assembly 132 or on an inside of the skid frame assembly 116 such as the rear idler wheel assembly 138.

The skid frame assembly 116 also includes a plurality of cross-braces or cross-bars. Again referring to the illustrated embodiment, the skid frame assembly 116 includes a front cross-brace 139 coupled to the front suspension assembly 124 with limiter straps 140. Respective intermediate cross-braces 142, 144, 146 and 148 are arranged in the skid frame assembly 116 at desired locations.

Figure 4A:
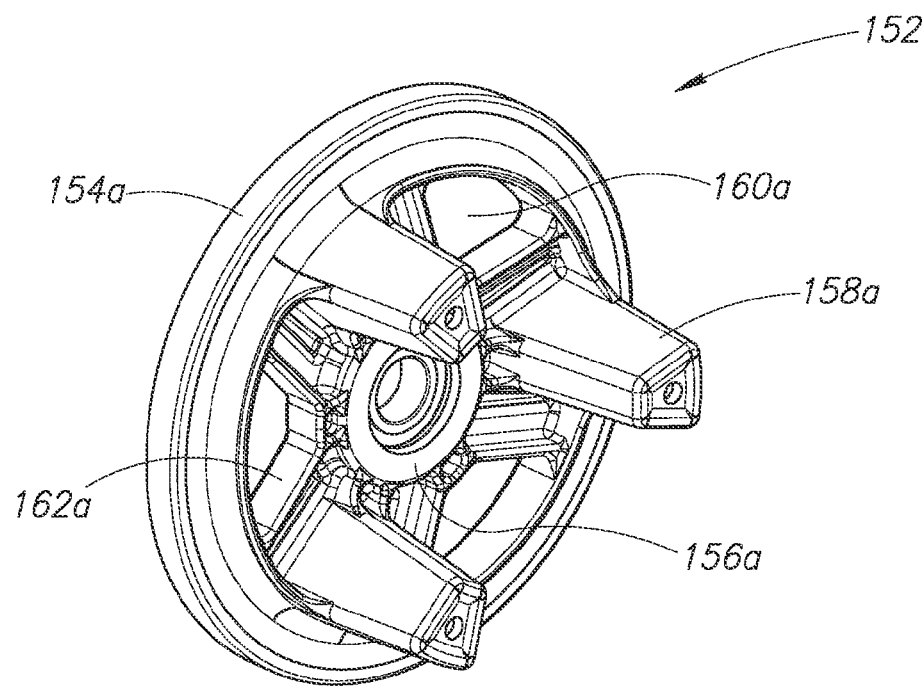
FIG. 4A is an isometric view looking outward toward an idler wheel of an idler wheel assembly according to an embodiment of the present invention.
Figure 4B:
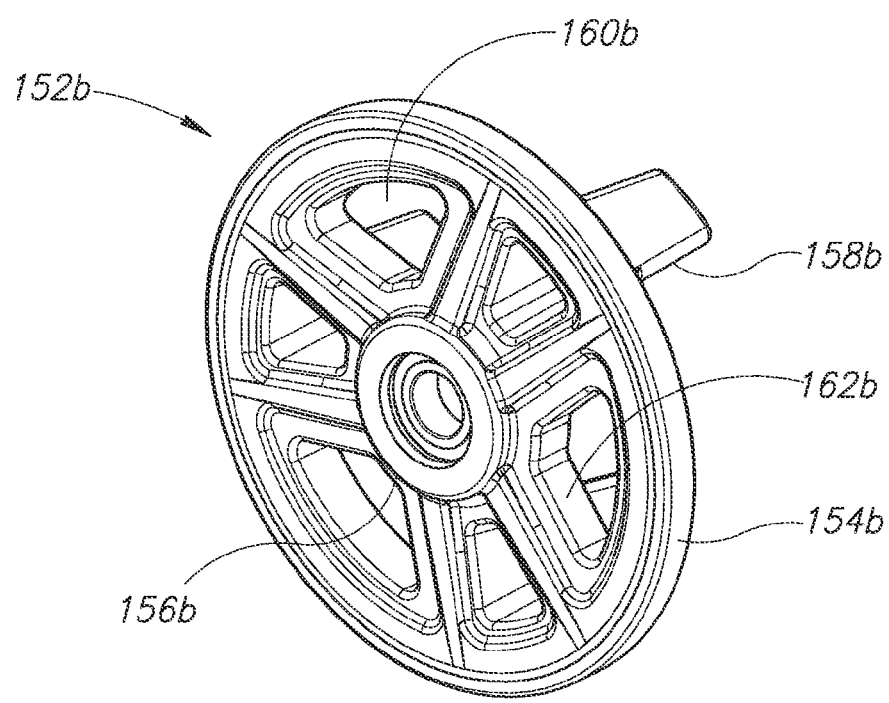
FIG. 4B is an isometric view looking inward toward another idler wheel of an idler wheel assembly according to an embodiment of the present invention

FIGS. 4A and 4B show left and right rear idler wheels 152a, 152b, respectively of the rear idler wheel assembly 138 (FIG. 3). In the illustrated embodiment, the idler wheels 152a, 152b are identical, so for purposes of brevity only the left idler wheel 152a will be described in detail and identical features will have the same reference numeral in FIG. 4B, but appended with the small letter "b." The left idler wheel 152a includes an outer periphery or diameter surface 154a, a central hub 156a, and cross-members 158a. The idler wheel 152a may include lightening holes or spaces 160a and structural spokes 162a that couple the hub 156a to the outer diameter surface 154a. The idler wheel 152a may be made from a variety of materials such as, but not limited to, thermoplastics, rubber, reinforced composites, metals, or a combination of the above, etc. The illustrated embodiment shows three cross-members 158a equally spaced, however the number of cross-members and spacing may be varied based on design or aesthetic considerations. The left and right cross members are secured together with fasteners (not shown) through the small holes in the inner ends of the cross members to form the interconnected idler wheel assembly or unit. In one alternate embodiment, the left and right idler wheels are constructed with no individual cross members at all, but rather with a continuous cylindrical wall from one to the other. The wall in such an embodiment is preferably recessed from the diameter surface 154, such that the track does not ride on the wall. In this and other embodiments, the left and right wheels can be integrally coupled together to form a single unit. They can even be formed together as a single unit, without having to fasten the left and right cross members with fasteners.

Figure 5:
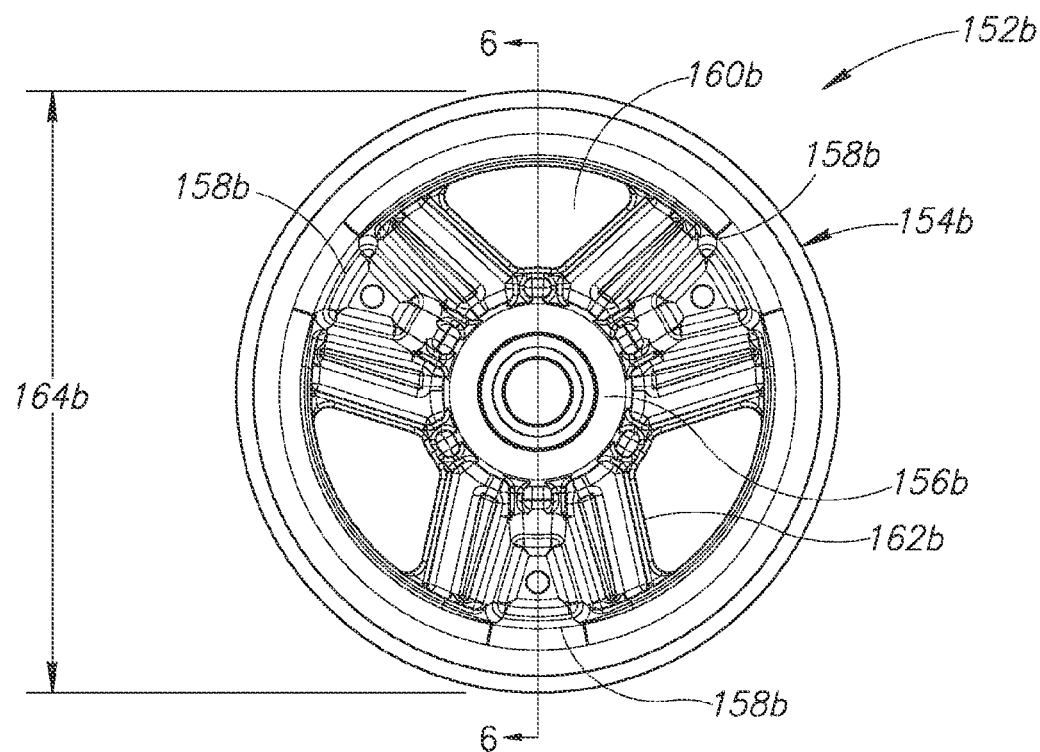
FIG. 5 is a side elevational view of the idler wheel of FIG. 4B.

FIG. 5 shows a side elevational view of the right, rear idler wheel 152b from FIG. 4b. The cross-members 158b may be sized to sufficiently fill the spaces between respective spokes 162b; however the cross-members 158b may be larger or smaller than illustrated. Further, the cross-members 158b are radially located between an outside diameter 164b of the idler wheel 152b and the hub 156b. The cross members are placed and shaped to most effectively address torsional and lateral loads on the completed idler wheel assembly without interfering with the operation of the track or suspension components. Thus, for example, the cross members are place near the outer diameter 154b to provide good mechanical support for lateral loads, but are not all the way at the outer diameter 154b, so they don't contact the track as it rotates. Although an intermediate wheel or outer diameter may alternatively be provided between the two wheels in another embodiment.

Figure 6A:
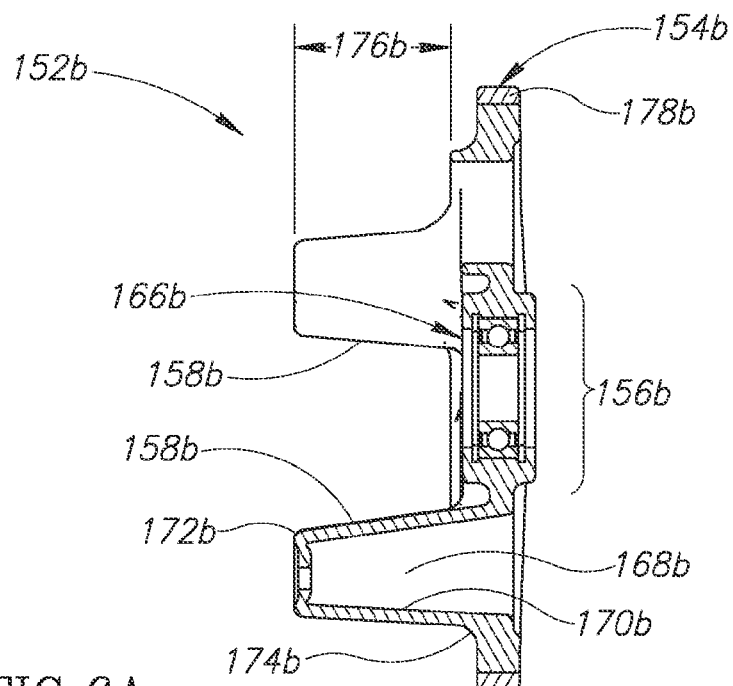
FIG. 6 is a cross-sectional view of the idler wheel of FIG. 5 taken along LINE 6-6 of FIG. 5.

FIG. 6A shows a cross-sectional view of the right, rear idler wheel 152b. A bearing 166b positioned in the hub 156b permits the idler wheel 152b to rotate relative to its axle (not shown). In the illustrated embodiment, the cross-members 158b have a cavities 168b for purposes of weight reduction and for fastener placement. The cavity 168b is defined by walls 170b and an end portion 172b. Further, the cross-members 158b may be integrally formed with the wheel 152b as indicated by a transition radius 174b. After assembly, the end portions 172b of each cross-member 158b for the right, rear idler wheel 152b are in contact with the corresponding cross-member end portions of the left, rear idler wheel 152a (FIG. 4A) and fastened together through the holes in the ends of the cross members. By way of example, a length 176b of the cross-members may be sufficient to permit contact with another cross-member and be fastened together. Therefore in operation, the end portions and walls of the cross-members provide the structural load path from one wheel to the other. Further, the cross-members help prevent the idler wheels from bending or deforming in an undesired manner.

Figure 6B:
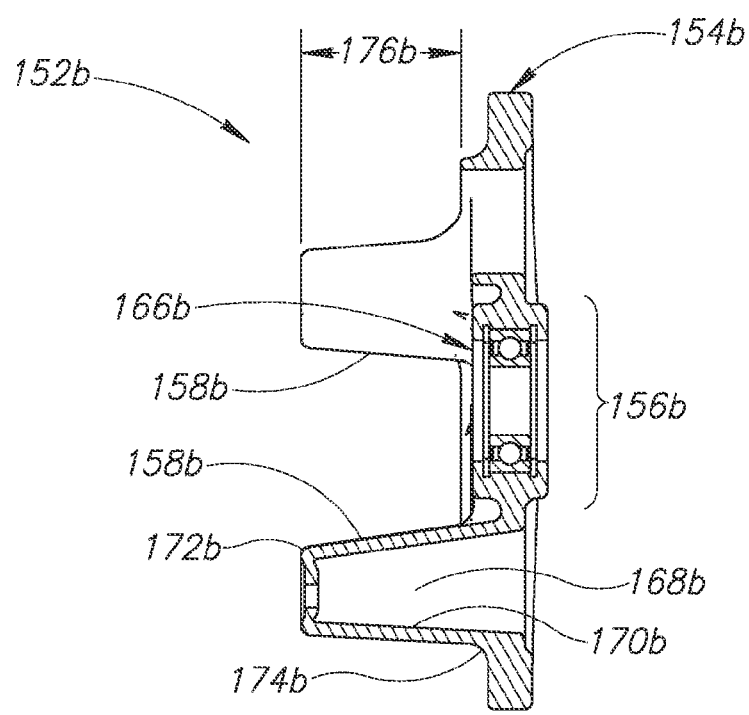

Note in FIG. 6A that the outer perimeter of wheel 152b includes a rubber "tire" member 178b to increase traction between the wheel and the track. However, especially when the wheel is used as a rear idler wheel, the traction between the polyethylene wheel material and the track is sufficient that the rubber member 178b is not necessary. As a rear wheel, more than a third of the circumference is typically engaged with the track as the track is held rearward by the wheel. In this situation, wheel slippage on the track is not an issue. Thus, the traction member can be omitted as shown in FIG. 6B.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined by reference to the claims that follow.

The embodiments of the invention in which an exclusive property or privilege is claimed are defined as follows:

1. A snowmobile comprising:
   a powertrain system having an engine, a drivetrain, and an endless flexible track operable by the drivetrain;
   a pair of front skis;
   a steering assembly maneuverable to turn the front skis;
   a skid frame assembly having at least one pair of slide rails; and
   an idler wheel assembly coupled to the skid frame assembly, the idler wheel assembly having at least two idler wheels each having an outer diameter surface and a hub, the two idler wheels being aligned on a common rotational axis, and the idler wheels cooperable with each other to transfer loads between the idler wheels, the idler wheel assembly further including a cross-member secured to both of the two idler wheels in a region between the hubs and outer diameter surfaces of the two idler wheels.

2. The snowmobile of claim 1, wherein the cross-member is substantially rigid.

3. The snowmobile of claim 1, wherein the cross-member includes a non-circular cross section.

4. The snowmobile of claim 1, wherein the cross-member is hollow.

5. The snowmobile of claim 1, wherein the idler wheels are made from an ultra-high-molecular-weight polyethylene material.

6. The snowmobile of claim 1, wherein the cross-member is made from an ultra-high-molecular-weight polyethylene material.

7. A snowmobile comprising:
   a powertrain system having an engine, a drivetrain, and an endless flexible track operable by the drivetrain;
   a pair of front skis;
   a steering assembly maneuverable to turn the front skis;
   a skid frame assembly having at least one pair of slide rails;
   an idler wheel assembly coupled to the skid frame assembly, the idler wheel assembly having at least two idler wheels aligned on a common rotational axis, and the idler wheels cooperable with each other to transfer loads between the idler wheels; and
   a cross member integrally formed with at least one of the idler wheels.

8. A skid frame assembly configured to receive a track of a snowmobile, the skid frame assembly comprising:
   a pair of slide rails;
   a pair of idler wheels coupled to the slide rails, each idler wheel having an outer diameter surface and a hub; and
   a cross-member extending from one idler wheel and cooperable with the other idler wheel, the cross-member substantially aligned with a common rotational axis of the idler wheels, and the cross-member located between the outer diameter surface and the hub;
   wherein the cross-member being cooperable with the other idler wheel includes the cross-member fixed to the one idler wheel and directly coupled to the other idler wheel.

9. The skid frame assembly of claim 8, wherein the cross-member includes a first cross-member portion extending from the one idler wheel and in contact with a second cross-member portion extending from the other idler wheel.

10. The skid frame assembly of claim 8, wherein the cross-member is hollow.

11. The skid frame assembly of claim 8, wherein the cross-member includes a non-circular cross-section.

12. The skid frame assembly of claim 8, further comprising at least two more cross-members extending between the idler wheels.

13. The skid frame assembly of claim 12, wherein the cross-members are arranged circumferentially equidistant from each other.

14. A method for arranging idler wheels of a snowmobile, the method comprising:
   coupling a first idler wheel to an inner surface of a skid frame assembly;
   coupling a second idler wheel to another inner surface of the skid frame assembly, the idler wheels sharing a common rotational axis; and
   structurally coupling the first and second idler wheels together with a cross-member that extends from the first idler wheel to the second idler wheel substantially parallel to, and offset from, the common rotational axis, the cross member being secured to both of the first and second idler wheels.

15. The method of claim 14, wherein structurally coupling the idler wheels together includes integrally forming the cross-member with at least one of the idler wheels.

16. The method of claim 14, wherein structurally coupling the idler wheels together includes abutting the cross-member extending from the first idler wheel to another cross-member extending from the second idler wheel.

17. The method of claim 14, wherein structurally coupling the idler wheels together includes positioning the cross-member between an outer diameter surface and a hub of at least one of the idler wheels.

18. An idler wheel assembly for a snowmobile having a skid frame assembly, the idler wheel assembly comprising:
   a first idler wheel coupled to the skid frame assembly;
   a second idler wheel coupled to the skid frame assembly, and
   a cross-member extending between the first and second idler wheels and linking them together, the cross-member being offset from an axis of rotation of the first and second idler wheels.

19. The idler wheel assembly of claim 18, wherein the cross-member includes a first cross-member extending from the first idler wheel and a second cross-member extending from the second idler wheel, the first and second cross-members being coupled together with a fastening device.

20. The idler wheel assembly of claim 18, further comprising a second cross-member extending between the first and second idler wheels.

21. The idler wheel assembly of claim 18, wherein the first idler wheel includes an outer diameter, the cross-member extending from the first idler wheel from a position spaced inside the outer diameter.

* * * * *